(12) United States Patent
Velasco

(10) Patent No.: US 11,169,791 B2
(45) Date of Patent: Nov. 9, 2021

(54) PROCESSING, MODIFICATION, DISTRIBUTION OF CUSTOM SOFTWARE INSTALLATION PACKAGES

(71) Applicant: ARXAN TECHNOLOGIES, INC., San Francisco, CA (US)

(72) Inventor: Daniel Hompanera Velasco, Boecillo (ES)

(73) Assignee: Digital.ai Software, Inc., Plano, TX (US)

( * ) Notice: Subject to any disclaimer, the term of this patent is extended or adjusted under 35 U.S.C. 154(b) by 0 days.

(21) Appl. No.: 16/878,427

(22) Filed: May 19, 2020

(65) Prior Publication Data

US 2020/0278853 A1 Sep. 3, 2020

Related U.S. Application Data

(63) Continuation of application No. 14/672,509, filed on Mar. 30, 2015, now Pat. No. 10,698,671.

(51) Int. Cl.
*G06F 9/44* (2018.01)
*G06F 8/61* (2018.01)
*H04L 29/08* (2006.01)

(52) U.S. Cl.
CPC ............. *G06F 8/61* (2013.01); *H04L 67/10* (2013.01); *H04L 67/28* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 6,021,438 A | * | 2/2000 | Duvvoori | ............. G06F 21/105 |
| | | | | 709/224 |
| 6,915,510 B1 | | 7/2005 | Tock et al. | |
| 6,948,164 B2 | | 9/2005 | Tinker | |
| 7,765,579 B2 | | 7/2010 | Wallace | |

(Continued)

OTHER PUBLICATIONS

International Search Report PCT/US2014/025397, dated Oct. 2, 2014, 1 page.

*Primary Examiner* — Qamrun Nahar
(74) *Attorney, Agent, or Firm* — Mannava & Kang, P.C.

(57) ABSTRACT

According to example configurations, an application wrapper resource receives an original installation package. The original installation package can be a factory-generated installation package that supports installation of a respective unwrapped application onto a computing device. The factory-generated installation package as described herein may be different than a typical installation package available from an application store. The application wrapper resource transforms the received original installation package into a (customized) wrapped application installation package for subsequent installation of the wrapped application on a respective computer device. The wrapped application installation package includes executable wrapper code supporting supplemental functionality with respect to the original unwrapped application. To wrap the original application using the executable wrapper code, the customization engine extracts one or more portions of application code from the original installation package and inserts the one or more portions of the application code into the wrapped application installation package.

19 Claims, 11 Drawing Sheets

(56) References Cited

U.S. PATENT DOCUMENTS

| | | |
|---|---|---|
| 7,779,394 B2 | 8/2010 | Horning et al. |
| 8,887,141 B2 | 11/2014 | Day et al. |
| 2001/0034846 A1* | 10/2001 | Beery .................. G06F 21/121 |
| | | 709/226 |
| 2002/0004935 A1 | 1/2002 | Huotari |
| 2002/0073398 A1 | 6/2002 | Tinker |
| 2003/0212983 A1 | 11/2003 | Tinker |
| 2004/0237067 A1 | 11/2004 | Sun et al. |
| 2006/0031407 A1 | 2/2006 | Dispensa |
| 2006/0123414 A1 | 6/2006 | Fors |
| 2006/0161768 A1 | 7/2006 | Baissus et al. |
| 2006/0230397 A1* | 10/2006 | Cook ........................ G06F 8/60 |
| | | 717/174 |
| 2007/0174824 A1* | 7/2007 | Relyea ...................... G06F 8/61 |
| | | 717/140 |
| 2008/0016099 A1 | 1/2008 | Ikeda |
| 2009/0119653 A1 | 5/2009 | Kettley et al. |
| 2010/0024036 A1* | 1/2010 | Morozov ................ G06F 21/74 |
| | | 726/26 |
| 2010/0037100 A1 | 2/2010 | Lopian |
| 2010/0287541 A1 | 11/2010 | Saunders et al. |
| 2010/0299665 A1* | 11/2010 | Adams ................ G06F 9/45558 |
| | | 718/1 |
| 2010/0333079 A1 | 12/2010 | Sverdlov et al. |
| 2011/0066999 A1 | 3/2011 | Rabinovich et al. |
| 2012/0036554 A1 | 2/2012 | Golan et al. |
| 2012/0124559 A1 | 5/2012 | Kondur |
| 2012/0284704 A1 | 11/2012 | Friedman |
| 2012/0304160 A1 | 11/2012 | Soeder |
| 2013/0283245 A1 | 10/2013 | Black et al. |
| 2014/0013316 A1 | 1/2014 | Kemmler et al. |
| 2014/0181801 A1 | 6/2014 | Voronkov et al. |

\* cited by examiner

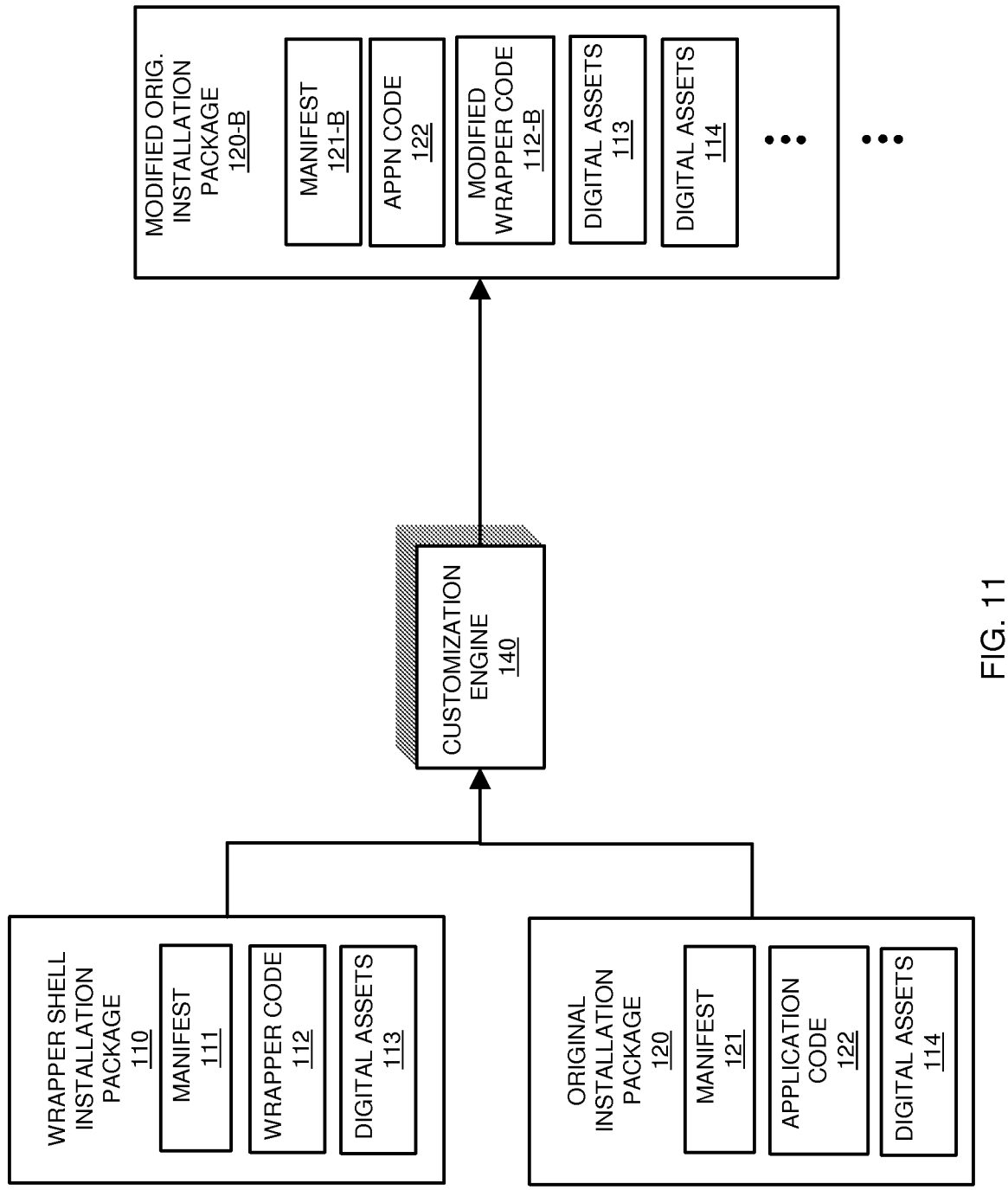

PROCESSING, MODIFICATION, DISTRIBUTION OF CUSTOM SOFTWARE INSTALLATION PACKAGES

PRIORITY

This application is a Continuation of commonly assigned and co-pending U.S. patent application Ser. No. 14/672,509, filed Mar. 30, 2015, the disclosure of which is hereby incorporated by reference in its entirety.

BACKGROUND

In many instances, computer software is delivered with an installer program that unpacks and installs an installation package onto a computer device. Computer devices typically include the ability to retrieve and execute an installer program to install software applications to the computer device.

An installation package produced by a developer can include any software resources that are needed to execute a respective application on the computer. For example, software source code produced by a developer is typically written in a high level language not understood by a computer device. The source code is compiled into so-called executable code (e.g., machine code understood by the computer). The executable code is included in an installation package for installation on the computer.

In addition to including executable application code, the installation package can include extra digital assets (e.g., configuration files, image files, etc.) enabling proper execution of the application on the computer device. Subsequent to installation of appropriate software a respective application onto the computer device, a user is able to execute the application.

Via copying and distribution of the same default installation package to different computer sites, multiple users can install a same basic factory-generated application having the same default settings.

In certain instances, it may be desirable to control one or more attributes of a corresponding application installed and executed on a mobile device. One way to control an installed application and provide additional functionality is to wrap the application prior to installation. Installation of a wrapped application by a target computer device includes installation of both the original application code as well as corresponding wrapper code. In general, the wrapper code can be configured to execute one or more functions associated with the original application.

BRIEF DESCRIPTION OF DIFFERENT EMBODIMENTS

According to certain conventional techniques, the essential operation of application wrapping can include inserting a dynamic library into an original installation package and then modifying original code in the installation package to provide supplemental functionality with respect to the original application.

Embodiments herein deviate with respect to conventional techniques. For example, embodiments herein include novel techniques to wrap applications.

More specifically, according to one embodiment, a processing resource such as a customization engine receives application code for installation of a respective application onto a computing device for execution. A customization engine according to embodiments herein extracts application code from the original installation package and inserts the extracted application code into a wrapped application (customized) installation package. The wrapped application installation package (into which the extracted application code is inserted) can be configured to include executable wrapper code for execution upon instantiation of the application.

In one embodiment, the executable wrapper code in the resulting wrapped application installed on a computer device can be configured to execute prior to execution of the original inserted application code when a user of the computer device executes the corresponding installed wrapped application.

In accordance with further embodiments, to generate the wrapped installation package as described herein, the customization engine can be configured to analyze a respective manifest file associated with application code in the original installation package to identify an original specified execution entry point into the application code. In particular, this can include analyzing a manifest file and/or other binary information in the original installation package. After determining the original specified execution entry point, the customization engine modifies the executable wrapper code to specify execution of the application code at the original execution entry point subsequent to execution of the executable wrapper code. Accordingly, in one embodiment, when the wrapped application is executed on a computer device, the executable wrapper code is executed first followed by execution of the original application code as specified by the original execution entry point.

In accordance with a further non-limiting example embodiment, the customization engine generates the executable wrapper code (included in the wrapped installation package), when executed, to specify a DLL (Dynamic Link Library) file and a corresponding type (from the original application code) to be called from the executable wrapper code to start execution of the application at the original specified execution entry point of the original application after execution of the executable wrapper code.

To further facilitate execution of the wrapped application, the customization engine can be configured to produce a manifest file for inclusion in the wrapped installation package. In one embodiment, the manifest file of the wrapped installation package is derived based at least in part from a manifest file associated with the application code (in the original unwrapped installation package).

The manifest file included in the wrapped installation package can be configured to enumerate digital resources associated with the application and the executable wrapper code.

Additionally, the customization engine can be configured to produce a corresponding manifest file for the wrapped application installation package to specify an entry point into the executable wrapper code as an initial execution point instead of the original initial execution entry point into the application code as specified by the manifest file of the original, unwrapped application.

In accordance with yet further embodiments, the customization engine produces the executable wrapper code to configure a processing environment for subsequent execution of the original application at the original entry point. Thus, at least a portion of the wrapper code can be configured to perform a set of operations for subsequent execution of the unwrapped application code at the original execution entry point.

Embodiments herein are useful over conventional techniques. For example, instead of injecting a wrapped library into the original installation package, embodiments herein include wrapping an original application into another "wrapping" application. One implication of doing this is, as previously discussed, that flow control rests with the wrapper code in the wrapped application. For example, the executed wrapper code launches the original application code (assembly code) after establishing one or more policies that are to be subsequently used by the original unwrapped application code. In contrast to embodiments herein, conventional wrapping approaches include execution of the original application code to start controlling a flow of executing code.

These and other embodiments are discussed in more detail below.

As mentioned above, note that embodiments herein can include a configuration of one or more computerized devices, workstations, handheld or laptop computers, personal computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations as discussed herein. One such embodiment comprises a computer program product including a non-transitory computer-readable storage medium (i.e., any suitable computer readable hardware storage medium or media) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other medium such as firmware or microcode in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, one particular embodiment of the present disclosure is directed to a method and computer program product that includes a computer readable hardware storage medium having instructions stored thereon. For example, in one embodiment, the instructions, when executed by computer processor hardware (one or more processor devices) in a computer system, cause a customization engine and/or other resources executing on one or more processor devices to: receive an original installation package, the original installation package configured to install an application onto a computing device; extract application code associated with the application from the original installation package; and insert the application code extracted from the original installation package into a customized installation package including executable wrapper code for execution upon instantiation of the application.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein can be embodied strictly as a software program, as a hybrid of software and hardware, or as hardware alone such as within a processor, or within an operating system or a within a software application.

Additionally, although each of the different features, techniques, configurations, etc., herein may be discussed in different places of this disclosure, it is intended that each of the concepts can be executed independently of each other or, where suitable, the concepts can be used in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), and additional points of novelty, the reader is directed to the Detailed Description section and corresponding figures of the present disclosure as further discussed below.

BRIEF DESCRIPTION OF THE DRAWINGS

FIG. 11 is an example diagram illustrating generation of one or more wrapped software application installation packages according to embodiments herein.

Figure 1:
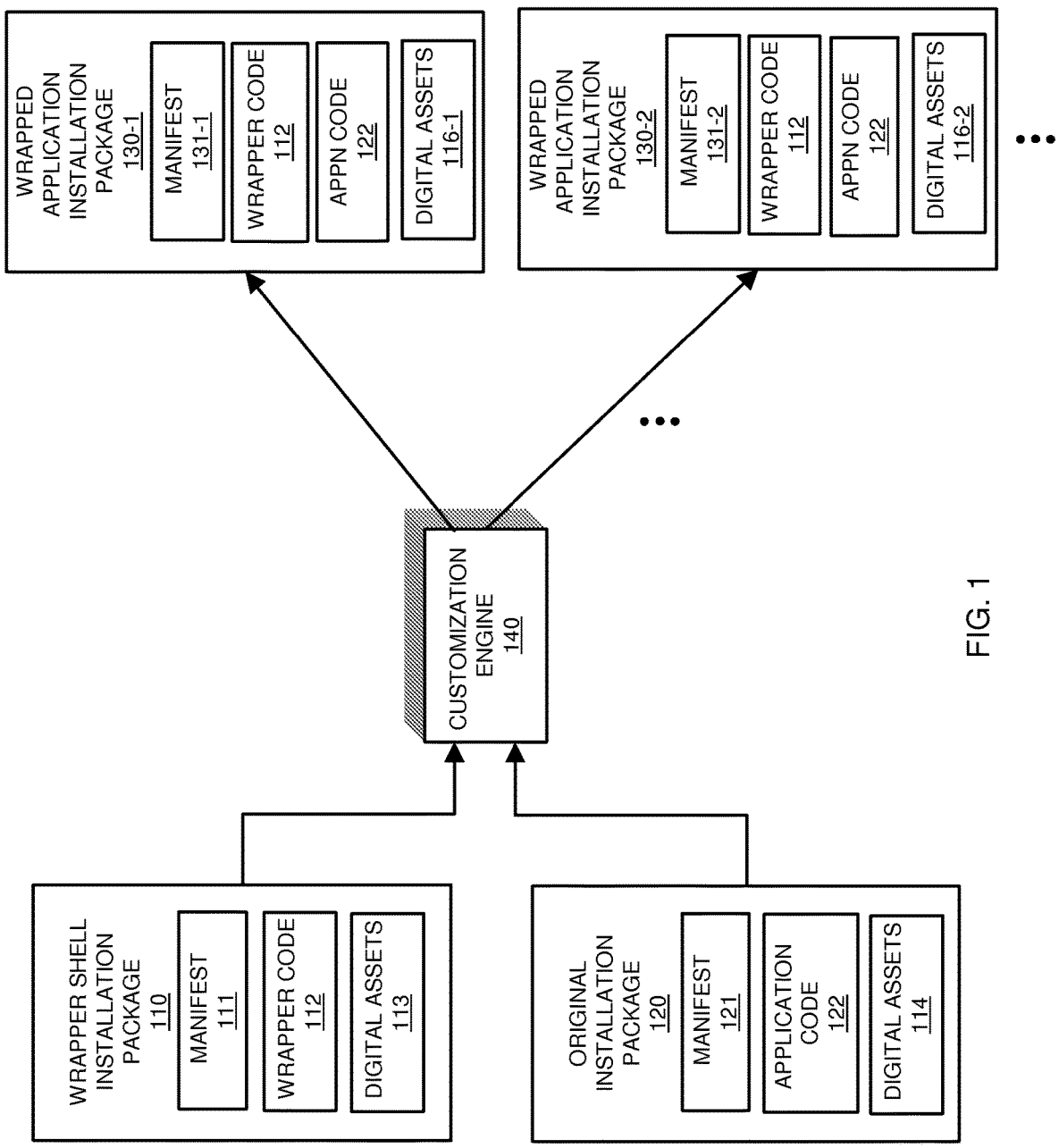
FIG. 1 is an example diagram illustrating generation of one or more wrapped software application installation packages according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a processing engine receives an original installation package. The original installation package can be a default installation package that is configured to support installation of a respective unwrapped application onto a computing device. The customization engine further receives modification guidelines (control information) indicating how to wrap the original application. For example, in one embodiment, the control information can indicate executable wrapper code to be applied to the received installation package to transform the received original installation package into a (customized) wrapped application installation package. As described herein, the executable wrapper code provides supplemental functionality with respect to the original application. To wrap the application using the executable wrapper code, the customization engine extracts application code from the original installation package and inserts (one or more portions) of the application code into a default application installation package. The default installation package can include the executable wrapper code.

As its name suggests, the resulting wrapped application installation package supports installation of the wrapped application instead of the original application. In one embodiment, the wrapped application installed on a computer device executes corresponding supplemental wrapper code first (to perform the one or more supplemental functions) followed by execution of the original application code. As previously discussed, the executed wrapper code can be configured to execute one or more functions and control one or more aspects associated with the application.

More specifically, FIG. 1 is an example diagram illustrating customization of a software installation package according to embodiments herein.

As shown, a processing resource (computer processor hardware, software, etc.) such as a customization engine 140 receives original installation package 120. By way of a non-limiting example, original installation package 120 is configured to facilitate installation of a respective software application to a computer device.

In one embodiment, the original installation package 120 includes manifest 121 (such as a manifest file) as well as corresponding (original) application code 122 (any of one or more digital resources such as executable code, configuration information, data, etc.).

Note that the software installation package (e.g., original installation package 120) and corresponding application code 122 can include any resources to facilitate installation of a respective software application onto a computer device such that a user is able to subsequently use the installed application (corresponding unwrapped application) on the computer device to perform one or more functions.

In one embodiment, the manifest 121 (manifest file) associated with application code 122 in the original installation package 120 enumerates a list of the contents (digital information or assets such as files) in the original installation package 120.

Figure 2:
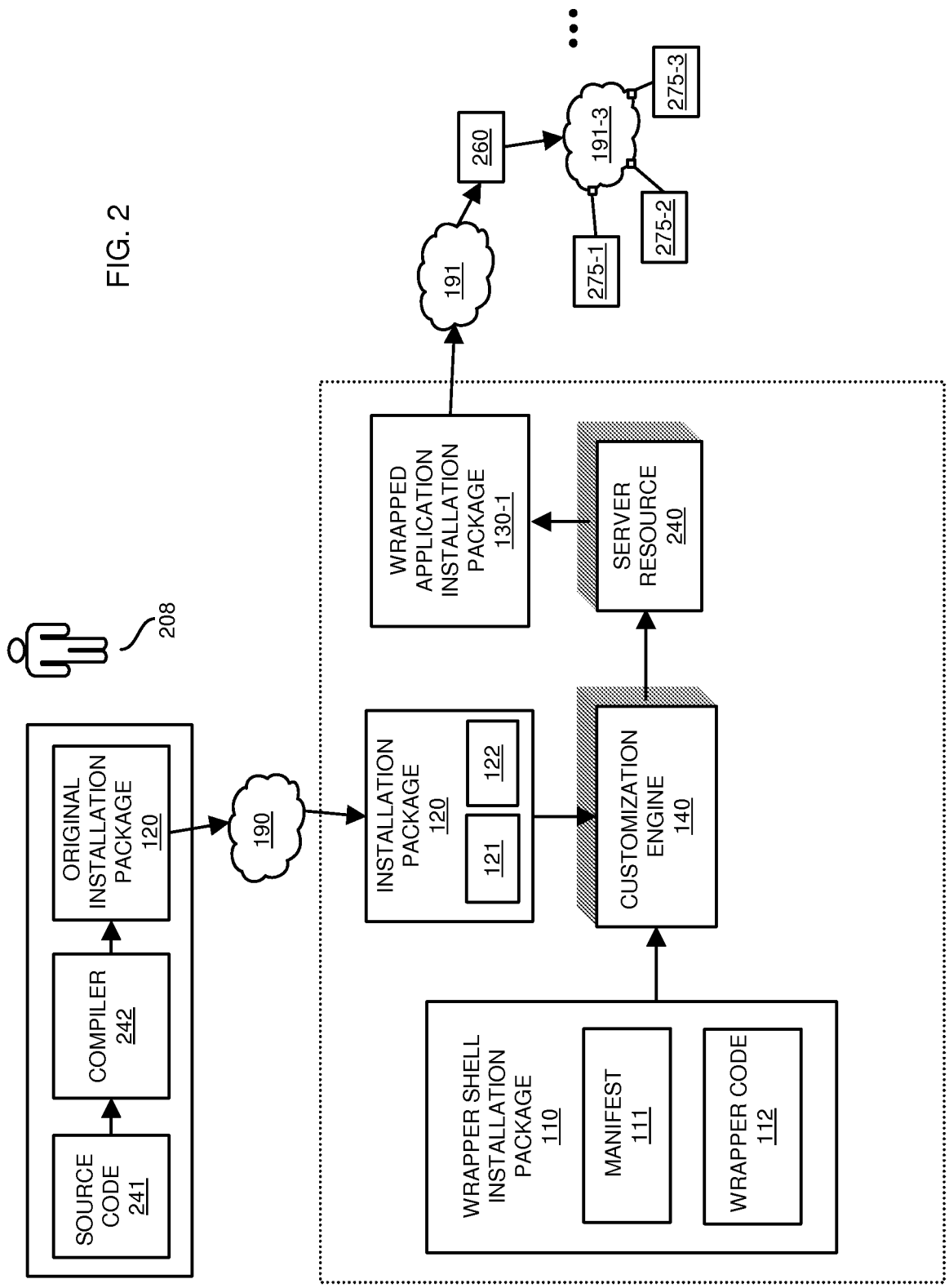
FIG. 2 is an example diagram illustrating customization and distribution of wrapped application installation packages according to embodiments herein.

In one embodiment, application code 122 of the original installation package 120 includes compiled resource information (executable code) such as one or more machine-readable instructions derived from compiling corresponding source code 241 in FIG. 2.

Referring again to FIG. 1, additionally, application code 122 of the original installation package 120 can further include non-compiled resource information such as files, configuration information, etc., used by the compiled instructions and/or operating system of a target computer device to carry out one or more different functions associated with the application when executed after installation.

In accordance with further embodiments, the original installation package 120 can be configured to include an installer resource (e.g., executable instructions) facilitating installation of a respective application onto a computer device.

In contrast to conventional techniques, the customization engine 140 (such as an application wrapper engine) in FIG. 1 can be configured to customize the original installation package 120 such that a subsequent installed wrapped application is at least partially customized for use by a user on the computer device upon and/or subsequent to installation.

In this example embodiment, the customization engine 140 modifies the original installation package 120 to produce wrapped application installation packages 130-1, 130-2, and so on. As its name suggests, the wrapped application installation packages 130 support installation of a respective wrapped version of the original application.

Each of the customized installation packages 130-1, 130-2, etc., can be customized for installation of a wrapped application to a respective target recipient to which the customized installation packages are subsequently distributed.

As further discussed below, wrapper shell installation package 110 (such as a default installation package) includes wrapper code 112 and corresponding manifest 111 used as a baseline by the customization engine 140 to create the one or more wrapped application installation packages 130. As further discussed below, when creating wrapped application installation package 130-1, the customization engine 140 extracts application code 122 and inserts it into respective wrapped application installation package 130-1.

FIG. 2 is an example diagram illustrating customization and distribution of wrapped application installation packages according to embodiments herein.

As shown in this example embodiment, developer 208 (software producer) produces source code 241 associated with a respective software application. The developer 208 uses compiler 242 to compile the source code 241 into compiled resource information (e.g., machine-readable instructions, etc.) included in the application code 122. As previously discussed, the application code 122 can include the compiled resource information as well as any additional non-compiled resource information needed to execute the application.

Further in this example embodiment, the developer 208 or other suitable one or more resources initiates distribution of the original installation package 120 to a facility that modifies the original installation package 120. In one embodiment, the facility receiving the original installation package 120 implements customization engine 140 to transform the original installation package 120 into a wrapped application installation package 130-1 for distribution to one or more target recipients.

For example, as shown, the customization engine 140 receives original installation package 120 from developer 208 or other entity in any suitable manner such as over network 190. The original installation package 120 may be encrypted to prevent access and/or use by unauthorized users. In the specific case of installation packages downloaded from a resource such as Windows Phone Store™, decryption is typically not possible, so wrapping is not possible in these latter instances. Accordingly, the factory-generated original installation package 120 is described herein is different than typical installation packages available from a standard consumer application store.

In addition to receiving the original installation package 120, the customization engine as discussed herein can receive instructions, commands, etc., from any suitable resource indicating how to wrap the application associated with the original installation package 120.

The commands, rules, control information, etc., when applied by the customization engine 140, transforms the received original installation package 120 (e.g., an installation package supporting installation of an unwrapped application) into a customized installation package (i.e., wrapped application installation package 130-1 supporting installation of a wrapped application).

The ability to customize or wrap installation packages can be particularly useful in multi-user organizations in which a network administrator must configure and/or control each of multiple applications on behalf of end users such as employees in the organization. Instead of each user or network administrator having to configure a same installed application, which may not support any supplemental control functionality because the application is unwrapped, a customized installation package received by a respective computer device installs a wrapped application instead of the original unwrapped application. As previously discussed, the wrapped application supports additional functionality over the unwrapped application.

In accordance with a more general case, the customized original installation package 120-1 can be configured in accordance with settings suitable for users working for an organization such as a corporation. In one embodiment, the wrapper code 112 in the wrapped application installation package 130-1 provides a network administrator or other suitable entity some amount of control over use of the corresponding wrapped application on a target user's device.

One or more customized installation packages 130-1, 130-2, etc., can be distributed to a network administrator 260 (human resource, computer resource, etc.) over network 191 in accordance with any suitable method. As discussed below, in one embodiment, the network administrator 260 initiates further distribution of the customized installation packages to one or more target recipients such as users of a corporation that are authorized to use a respective wrapped application.

For example, in one embodiment, the customized installation packages 130 produced by customization engine 140 can be transmitted over a network 191 to a corresponding network administrator 260. The network administrator 260 of an organization, in turn, can further distribute the customized installation packages 130-1, 130-2, etc., to corresponding one or more computer devices 275 or respective target users.

In this non-limiting example, assume that the network administrator 260 forwards wrapped application installation package 130-1 over network 191-3 (e.g., a private or public network, wireless network, hardwired network, etc.) to computer device 275-1; network administrator 260 forwards wrapped application installation package 130-2 over network 191-3 to computer device 275-2, and so on.

In accordance with yet further embodiments, if desired, the network administrator 260 can forward the same wrapped application installation package 120-1 to each of recipients 275-1, 275-2, 275-3, etc.

One or more of the computer devices 275 can be mobile handheld devices (such as so-called BYOD or Bring Your On Device) used by respective employees to carry out employment tasks as well as private tasks. In one embodiment, the network administrator 260 provides modification guidelines, instructions, control information, etc., (and potentially including wrapper shell installation package 110) to the customization engine 140 to create the customized installation packages 130 for subsequent distribution to the computer devices 275.

Figure 3:
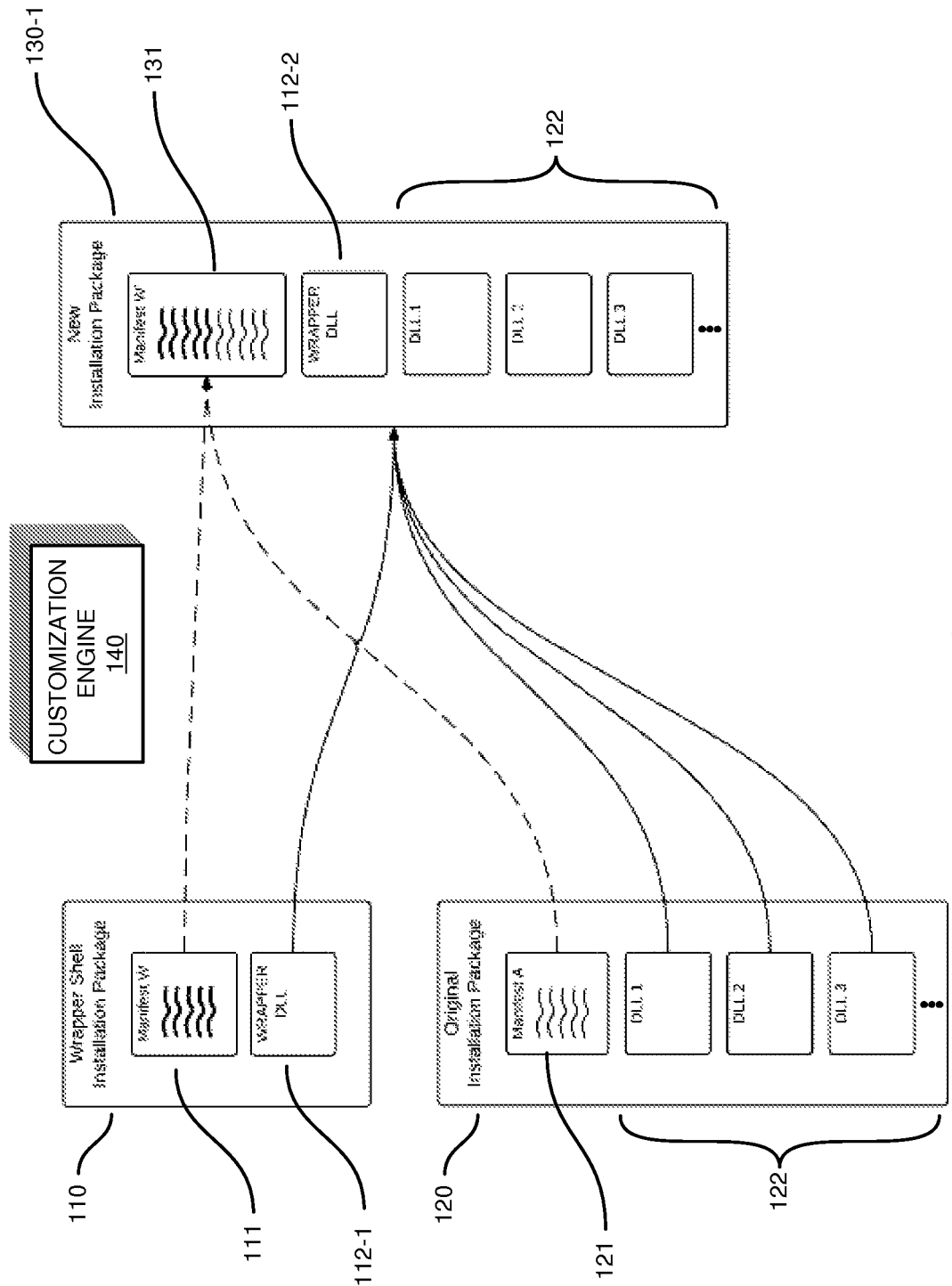
FIG. 3 is an example diagram illustrating generation of a respective wrapped application installation package according to embodiments herein.

FIG. 3 is an example diagram illustrating generation of a respective wrapped application installation package according to embodiments herein.

In this more detailed example embodiment, the customization engine 140 receives original installation package 120. The customization engine 140 extracts the wrapper code 112-1 and inserts it into the wrapped application installation package 130-1 as wrapper code 112-2. As further discussed below, the customization engine 140 can be configured to make modifications to the wrapper code 112-2 in order to properly wrap the application associated with the original installation package 120.

As an alternative to extracting respective code such as wrapper code 112-1 from the wrapper shell installation package 110, the customization engine 140 can be configured to make a copy of all or a portion of the wrapper shell installation package as a starting point to create the new installation package 130-1. As further discussed below, the customization engine 140 performs extraction operations with respect to the original installation package 120 to finalize creation of the new installation package 130-1.

Additionally, as shown, the customization engine 140 extracts files including DLL1, DLL2, DLL3, etc., from the original (unwrapped) installation package 120 and inserts them into the wrapped application installation package 130-1 as shown. Note that extraction of dynamic link libraries DLL1, DLL2, DLL3, etc., is shown by way of non-limiting example only.

Any suitable resources in the wrapper shell installation package 110 and/or the original installation package 120 can be extracted and subsequently included in the wrapped application installation package 130-1. For example, any of one or more of the digital assets 113 in the wrapper shell installation package 110 can be extracted (copied) and thereafter included as respective one or more digital assets 116-1, 116-2, etc., in the wrapped application installation packages 130. Similarly, any of one or more of the digital assets 114 in the original installation package 120 can be extracted (copied) and thereafter included as one or more of the digital assets 116-1, 116-2, etc., in the wrapped application installation packages 130. Accordingly, embodiments herein are not limited to extraction and inclusion of wrapper code 112 and application code 122 in the target wrapped application installation packages 130.

In addition to the extraction and insertion of one or more digital assets into the wrapped application installation package 130-1, the customization engine 140 produces a respective manifest 131 for the wrapped application associated with wrapped application installation package 130-1. As shown, the customization engine derives the manifest 131 for the wrapped application installation package 130-1 based upon the manifest 111 in the wrapper shell installation package 110 and the manifest 121 in the original installation package 120.

Embodiments herein differ over conventional techniques. For example, embodiments herein can be used to wrap applications such as .XAP (Silverlight Application Package) applications. More specifically, instead of injecting a wrapped library (i.e., wrapper code) into the original installation package 120-1 to create a resulting wrapped application installation package, embodiments herein include wrapping an original application into another "wrapping" application. One implication of doing this (as further discussed below) is that flow control can be configured to control by the wrapper code 112 in the wrapped application. For example, as further discussed below, upon execution of the wrapped application, the wrapper code 112-2 launches the original application code (such as assembly code) after establishing one or more functions or policies that are to be subsequently used by the unwrapped original application code 122.

Figure 4:
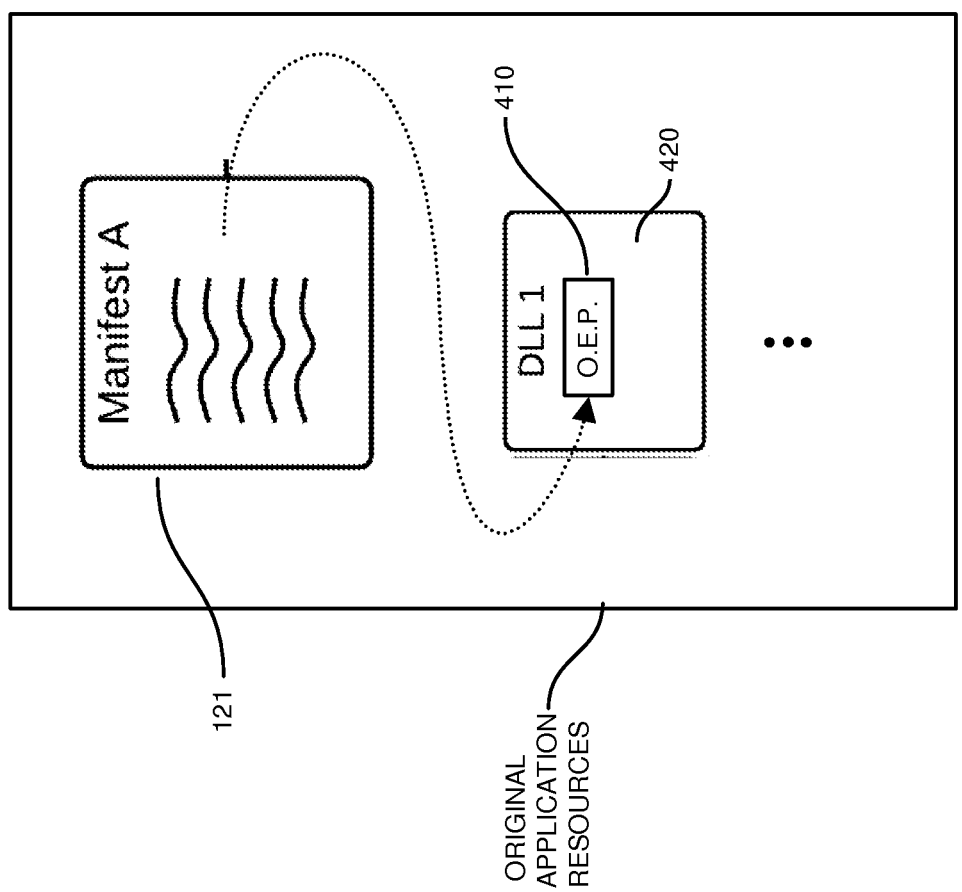
FIG. 4 is an example diagram illustrating that a manifest file specifies an original entry point into an unwrapped application according to embodiments herein.

FIG. 4 is an example diagram illustrating that a manifest file specifies an original entry point into an unwrapped application according to embodiments herein.

Assume in this example embodiment, that the manifest 121 associated with the original installation package 120 indicates an original entry point 410 into the application code 420 (such as a dynamic link library DLL1 of data, executable code such as callable functions, etc.). The original entry 410 associated with application code 420 represents a starting location in which to execute application code 420 associated with the unwrapped original application code. As further discussed below, the customization engine 140 produces the wrapped application installation package 130-12 first execute wrapper code 112-1 followed by execution of the original application code 420.

Figure 5:
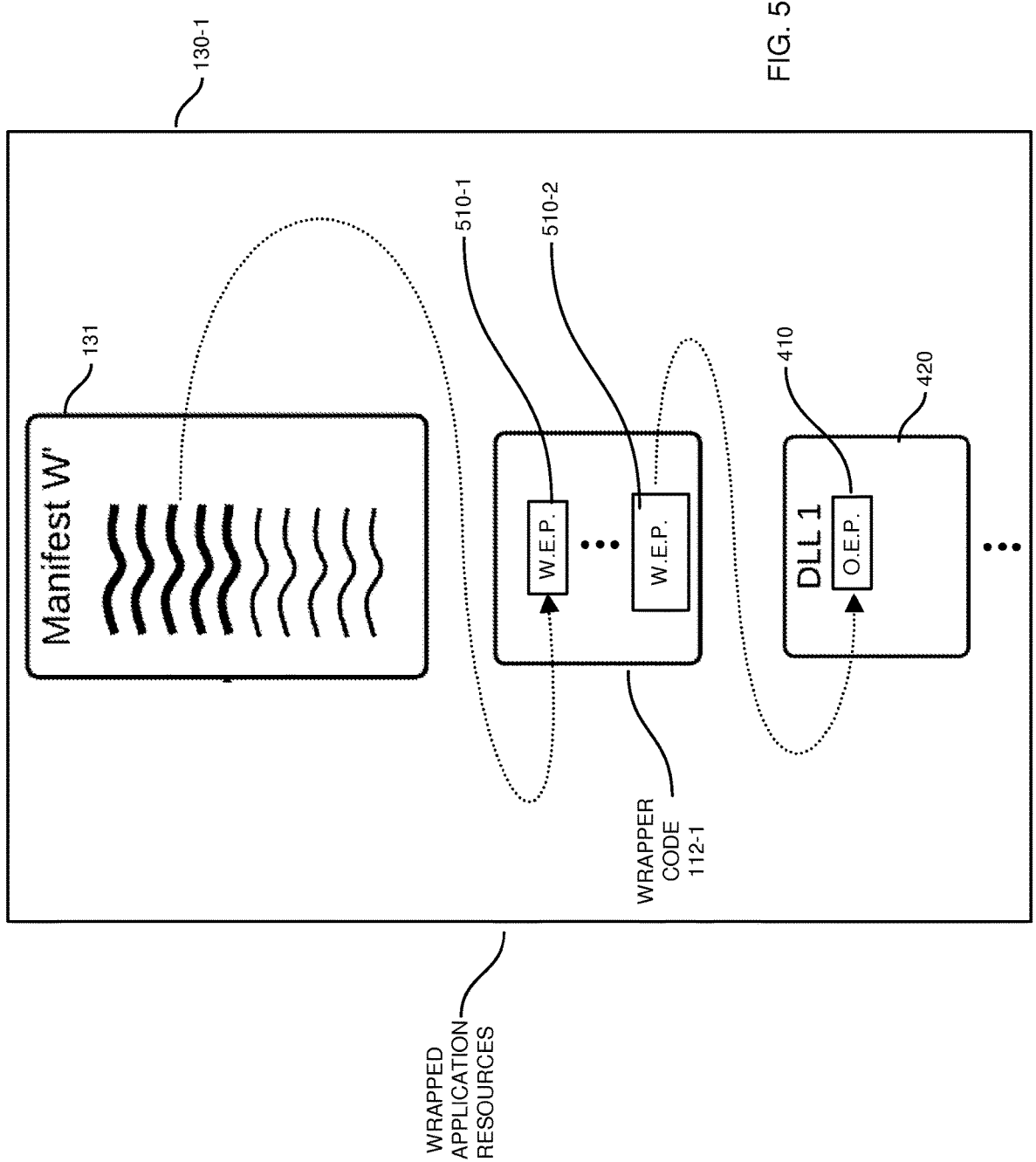
FIG. 5 is an example diagram illustrating a configuration of a manifest file specifying an entry point into wrapper code and wrapper code specifying an entry into an original entry point of application code according to embodiments herein.

FIG. 5 is an example diagram illustrating a configuration of a manifest file specifying an entry point into wrapper code as well as wrapper code specifying an entry into an original entry point of application code according to embodiments herein.

As previously discussed, embodiments herein include wrapping a respective application by inserting wrapper code 112-2 into the wrapped application installation package 130-1. To ensure that the wrapper code 112-2 is executed prior to the application code starting at original entry 410, the customization engine 140 produces the manifest 131 associated with the wrapped application installation package 130-1 to indicate that the starting location, when launching the respective wrapped application, is wrapper entry point 510-1 instead of the original entry point 410.

In accordance with further embodiments, the customization engine 140 produces and/or modifies the wrapper code 112-2 to indicate the wrapper exit point 510-2 (i.e., code that executes the original application code in DLL1 (420). Inclusion of the exit point 510-2 in the wrapper code 112-2, ensures that execution of the wrapped application continues at the original entry point 410 associated with the application code 420 upon completing execution of all or part of the wrapper code 112-2.

Thus, when a respective user launches the wrapped application installed via the wrapped application installation package 130-1, the corresponding computer device uses the manifest file 131 to identify the start point (wrapper entry point 510-1) in which to start executing the wrapper code 112-2.

After executing one or more functions such as including establishing one or more policies associated with the unwrapped application, via the wrapper exit point 510-2, the wrapper code 112-1 initiates execution of the original entry point 410 of code 420, passing control to the original unwrapped application code 420. In one embodiment, the wrapper code 112-2 is hard-coded to indicate and/or ensure that execution continues at the original unwrapped application code 420 as specified by the original entry point 410.

In accordance with yet further embodiments, note that the customization engine 140 can be configured to produce the executable wrapper code 112 to configure a respective processing environment (in the computer executing the wrapped application) for subsequent execution of the original unwrapped application at the original entry point 410. For example, at least a portion of the wrapper code 112 can be configured to perform a set of operations (such as setting up binary information in memory) for subsequent execution of the unwrapped application code at the original execution entry point 410.

Figure 6:
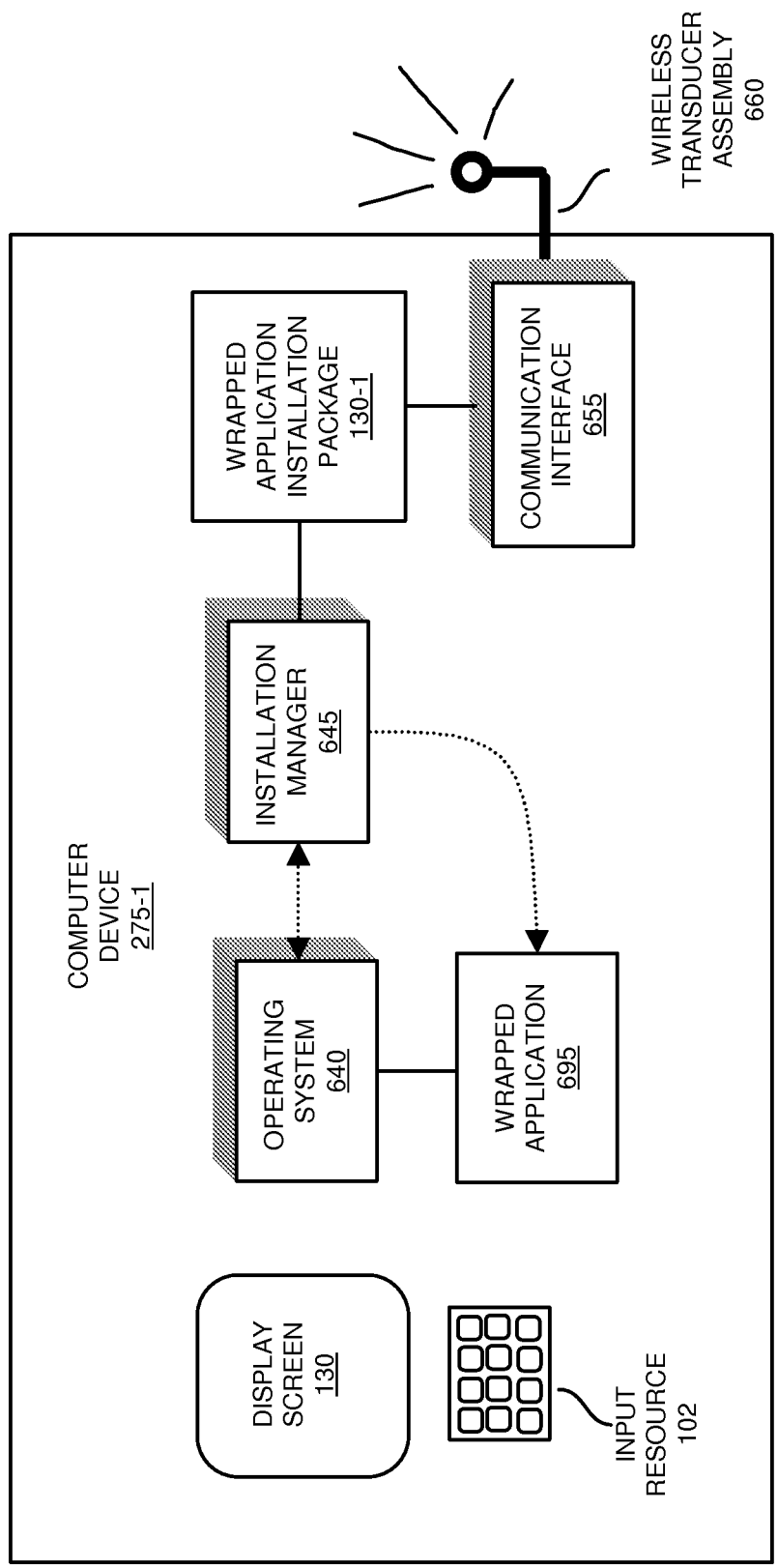
FIG. 6 is an example diagram illustrating a communication device and related components for installing and executing a wrapped application according to embodiments herein.

FIG. 6 is an example diagram illustrating a communication device and related components for installing and executing a wrapped application according to embodiments herein.

As shown in this example, a target computer device 275-1 (e.g., a mobile device such as a handheld, portable communication device, etc.) can include a communication interface 655 to communicate with one or more remote devices in a network environment.

In this non-limiting example, the computer device 275-1 includes a wireless transducer assembly 660 in which to communicate over a wireless portion of network 191-3. Note that the communication interface 655 can be configured to support communications over any type of communication media such as including a hardwired link.

Via communication interface 655, assume in this example embodiment that the computer device 275-1 receives wrapped application installation package 130-1 produced by customization engine 140. Based on input from a user operating computer device 275-1, the respective user initiates installation of the wrapped application 695 associated with the wrapped application installation package 120-1 to computer device 275-1.

In one embodiment, the user of the computer device 275-1 provides input through input resource 102 to initiate execution of installation manager 645. The installation manager 645 can be a software function included in the wrapped application installation package 130-1, operating system 640, or function from a combination of both.

During installation, after verifying a signature of the wrapped application installation package 130-1, the installation manager 645 retrieves and/or copies information in the wrapped application installation package 130-1 locally to the computer device 275-1. For example, in one embodiment, the installation manager 645 copies the digital resources in the wrapper application installation package 130-1 including manifest 131-1, wrapper code 112, application code 122, etc., to the appropriate target location such as one or more storage locations in the computer device 275-1.

As previously discussed, the customized installation package 130-1 can specify one or more functions to perform prior to execution of the original application. By way of a non-limiting example, upon execution in the computer device 275-1, the wrapper code 112 in the wrapped application 695 can be configured to retrieve executable code (such as policy information) from a remote location such as a pre-specified server resource as indicated by the executed wrapper code 112. The wrapper code 112 initiates execution of the retrieved executable code to perform a respective function associated with the unwrapped application.

As a specific example, the retrieved executable code can be configured to establish a respective policy associated with the user operating the computer device 275-1. The respective policy controls use of the installed application by the respective user of the computer device 275-1.

In accordance with further embodiments, the wrapper code 112 can be configured to initiate display of images on the display screen 130 for viewing by the respective user of computer device 275-1. Thus, via wrapper code 112, the customization engine 140 can configure the respective wrapped application to display supplemental images that are not capable of being displayed by the original unwrapped application.

As another example, the executed wrapper code can be configured to challenge the respective user of the mobile communication device 275-1 to provide appropriate authentication credentials to use the wrapped application. The wrapper code 112 can be configured to communicate over network with a remote location to determine whether or not the user provides the appropriate authentication credentials. If so, the user can be allowed to use the application. If the user of the computer device 275-1 does not provide the appropriate credentials, the wrapper code 112 prevents launching of the application code 122, preventing the respective user from using the wrapped application.

Note that customization via wrapper code 112 can include, for example, customizing a respective wrapped application to include a URL (Uniform Resource Locator) and port number of a server associated with a company that controls the executed wrapped application.

FIG. 11 is an example diagram illustrating generation of a wrapped application installation package (e.g., a customized installation package) according to embodiments herein.

In this example embodiment, the original installation package 120 (or a respective copy) is used as a baseline to produce the modified original installation package 120-B. For example, the customization engine 140 initially produces a respective copy of the original installation package 120. The customization engine 140 inserts a modified version of wrapper code 112 (namely, modified wrapper code 112-B) into the original installation package 120 to produce the modified original installation package 120-B. Note that this operation can include inserting the wrapper code 112 into the modified original installation package 120-B and then modifying the wrapper code 112 into modified wrapper code 112-B.

In one embodiment, in a manner as previously discussed, the modified wrapper code 112-B includes the wrapper code exit point 510-2, which points to execution of the application code 122 at the original execution entry point 410 of application code 122.

Additionally, the customization engine 140 modifies the manifest 121 in the original installation package 122 to produce modified manifest 121-B. In one embodiment, the modification to the original manifest 121 includes producing the modified manifest 121-B to indicate execution of the modified wrapper code 112-B at wrapper entry point 510-1 as previously discussed.

As further shown, the modified original installation package 120-B can further include digital assets 113 present in the wrapper shell installation package 110 as well as digital assets 114 in the original installation package 120.

Accordingly, upon execution of the wrapped application in accordance with the modified original installation package 120-B, a respective processing engine first initiates execution of the modified wrapper code 112-B as specified by the modified manifest 121-B. Subsequent to partial or complete execution of the modified wrapper code 112-B, the modified wrapper code 112-B initiates and causes execution of the application code 122 at the original execution entry point 410 as specified by manifest 121.

Figure 7:
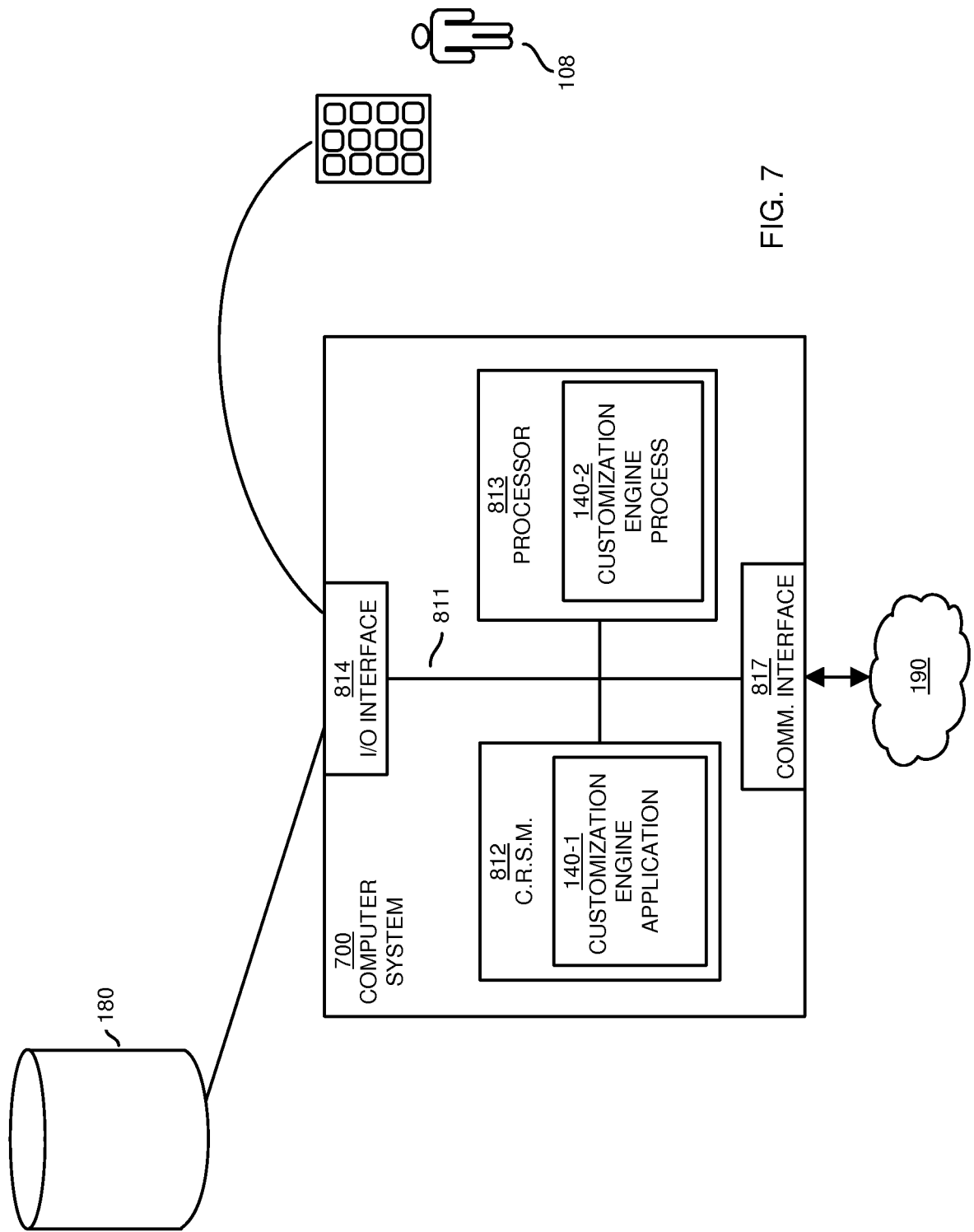
FIG. 7 is an example diagram illustrating an example computer architecture for implementing functionality according to embodiments herein.

FIG. 7 is an example block diagram of a computer hardware system for executing operations according to embodiments herein. Any of the functionality and/or resources as discussed herein executed with computer system 700 or the like to perform functionality as discussed herein.

Computer system 700 (e.g., computer hardware, software, etc.) can be or include one or more computerized devices such as a personal computer, workstation, portable computing device, mobile device, handheld device, console, network terminal, processing device, network device, etc.

Note that the following discussion provides a basic embodiment indicating how to execute functionality according to embodiments herein using a computer system. However, it should be noted that the actual configuration for carrying out the operations as described herein can vary depending on a respective application.

As shown, computer system 700 of the present example includes an interconnect 811 that couples computer readable hardware storage media 812 (i.e., a non-transitory type of computer readable storage media) in which digital information can be stored and/or retrieved, a processor device 813, I/O interface 814, a communications interface 817, etc.

I/O interface 814 provides connectivity to different resources such as a repository, display screen, keyboard, computer mouse, etc.

Computer readable storage medium 812 can be any suitable device such as memory, optical storage, hard drive, floppy disk, etc. In one embodiment, the computer readable storage medium 812 is a non-transitory computer readable storage media (e.g., any hardware storage media) to store instructions and/or data.

Communications interface 817 enables the computer system 700 and processor device 813 to communicate over a network 190 to retrieve information from remote sources and communicate with other computers. I/O interface 814 enables processor device 813 to retrieve respective information from a repository.

As shown, computer readable storage media 812 can be encoded with customization engine application 140-1 (e.g., software, firmware, etc.) executed by processor 813.

During operation of one embodiment, computer processor hardware 813 (e.g., one or more computer devices) accesses computer readable storage media 812 via the use of interconnect 811 in order to launch, run, execute, interpret or otherwise perform the instructions of customization engine application 140-1 stored on computer readable storage medium 812. Customization engine application 140-1 can include appropriate instructions, logic, etc., to carry out any or all functionality associated with the resources (e.g., clients, servers, notification network, network administrator, etc.) in a computer network environment as discussed herein.

Execution of the customization engine application 140-1 produces processing functionality such as software process 140-2 in computer processor hardware 813. In other words, the customization engine process 140-2 associated with processor device 813 represents one or more aspects of executing customization engine application 140-1 within or upon the computer processor hardware 813 in the computer system 700.

Those skilled in the art will understand that the computer system 700 can include other processes and/or software and hardware components, such as an operating system that controls allocation and use of hardware resources to execute customization engine application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, portable handheld device, video game console, handheld video game device, a peripheral device such as a switch, modem, router, or in general any type of computing or electronic device.

Functionality supported by resources in network environment and resources therein will now be discussed via flowcharts in FIGS. 8-10. Note that there will be some overlap with respect to concepts discussed above for FIGS. 1 through 7. Also, note that the steps in the below flowcharts need not always be executed in the order shown. That is, the steps can be executed in any suitable order.

Figure 8:
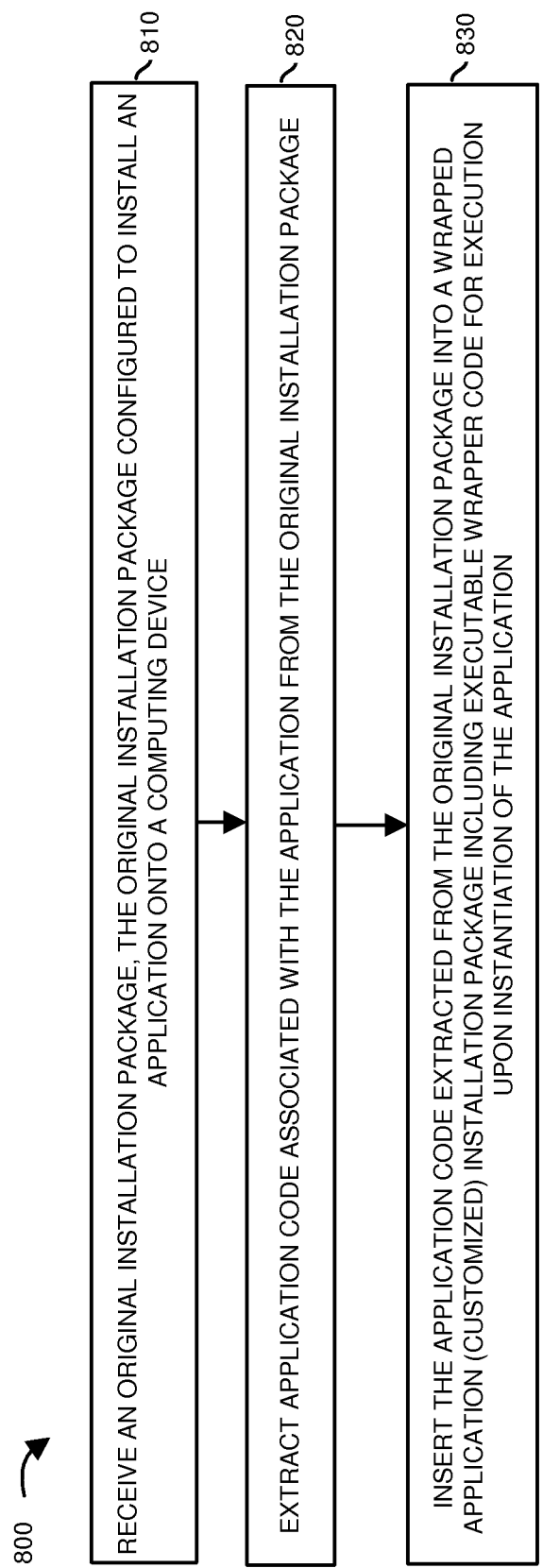
FIG. 8 is a flowchart illustrating an example method of generating one or more wrapped application installation packages according to embodiments herein.

FIG. 8 is a flowchart illustrating an example method of generating one or more wrapped application installation packages according to embodiments herein. The steps in the following flowchart can be executed in any suitable order.

In step 810, the customization engine application 140-1 receives an original installation package 120 including an unwrapped application. In one embodiment, the original installation package 120 is configured to install an unwrapped application onto a respective computing device.

In step 820, custom engine application 140-1 extracts application code 122 (such as one or more files) associated with the unwrapped application from the original installation package 120.

In step 830, the customization engine application 140-1 inserts, includes, mixes, joins, etc., the application code 122 extracted from the original installation package 120 in a wrapped application installation package 130-1 including executable wrapper code 112 for execution upon instantiation of the application.

As mentioned above, the customization engine 140 can repeat the process in flowchart 800 to generate customized installation packages for each of multiple target recipients (such as computer devices 275).

Figure 9:
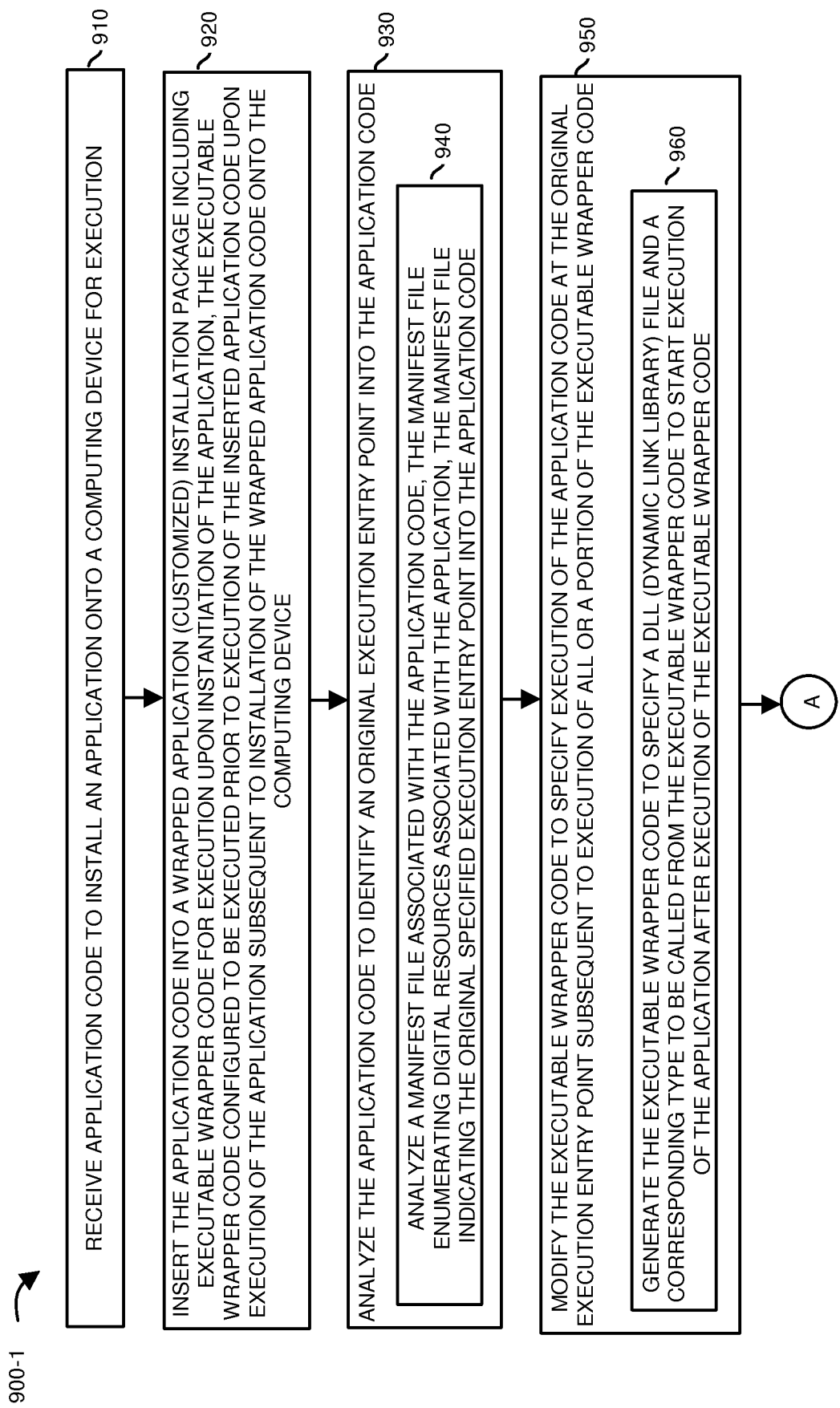
FIGS. 9 and 10 combine to form a flowchart illustrating generation of one or more wrapped application installation packages according to embodiments herein.
Figure 10:
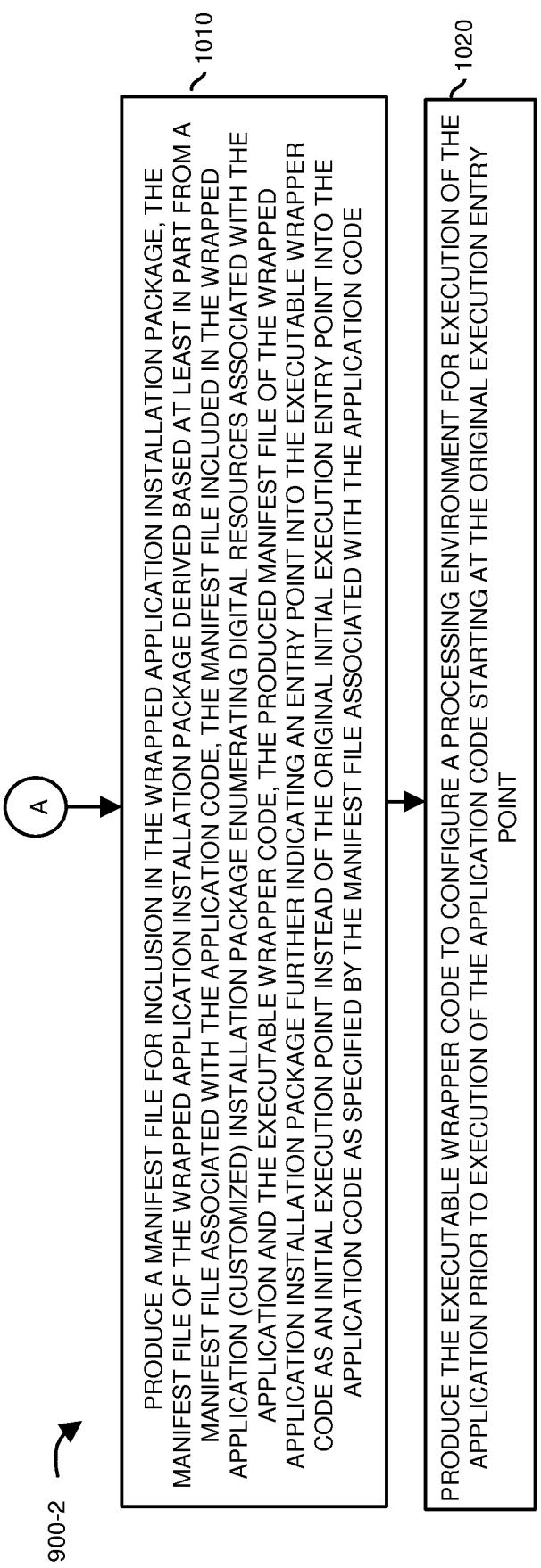

FIGS. 9 and 10 combine to form a flowchart illustrating generation of one or more wrapped application installation packages according to embodiments herein. Note again that the steps in the following flowcharts can be executed in any suitable order.

In step 910, the customization engine application 140-1 retrieves (extracts) application code 122 from the original installation package 120. As previously discussed, the application code 122 supports execution of a respective application on a computing device.

In step 920, the customization engine application 140-1 inserts the (extracted) application code into a wrapped application installation package 130-1, which includes executable wrapper code 112 for execution upon instantiation of the application supported by application code 122.

In one embodiment, as previously discussed, and as further discussed by the operations below, the customization engine application 140-1 can be configured to produce the wrapped application installation package 130-1 and corresponding digital components such that, upon execution of the wrapped application, the executable wrapper code 112 executes prior to execution of the inserted application code 122 upon execution of the application subsequent to installation on a respective computing device 275-1.

In step 930, in furtherance of wrapping the application associated with original installation package 120, the customization engine application 140-1 analyzes the original installation package 120 to identify an original execution entry point into the application code 122 to execute the respective unwrapped application.

More specifically, in sub-step 940 associated with step 930, the customization engine application 140-1 analyzes manifest 121 associated with the application code 122. The manifest 122 enumerates digital resources associated with the application as well as the original execution entry point into the application code 122.

In step 950, the customization engine application 140-1 modifies the executable wrapper code 112 to specify execution of the application code 122 at the original execution entry point subsequent to execution of at least a portion of the executable wrapper code 112.

In sub-step 960 associated with step 950, the customization engine application 140-1 generates the executable wrapper code 112 to specify a DLL (Dynamic Link Library) file and a corresponding type to be called from the executable wrapper code 112 to start execution of the application after execution of at least a portion of the executable wrapper code 112. In one embodiment, the wrapper code 112 performs any of the suitable functions that are needed to subsequently execute application code 122.

Processing flow continues as shown in FIG. 10.

In step 1010 of flowchart 900-2 in FIG. 10, the customization engine application 140-1 produces a manifest (file) 131-1 for inclusion in the wrapped application installation package 130-1. In one embodiment, the customization engine application 140-1 derives the manifest 131-1 based at least in part on the manifest 121 associated with the application code 122 as well as the manifest 111 associated with the wrapper code 112. As previously discussed, the manifest (file) 131-1 included in the wrapped application installation package 130-1 enumerates one or more digital resources associated with the original unwrapped application and the executable wrapper code 112 that is used to wrap the original application. The customization engine 140 produces the manifest 131-1 of the wrapped application installation package 130-1 to indicate an entry point 510-1 into the executable wrapper code 112 as an initial execution point instead of the original initial execution entry point 410 into the application code 122 as specified by the manifest 121 associated with the application code 122.

In step 1020, the customization engine application 140-1 produces the executable wrapper code 112 to configure a processing environment (memory and computer processing hardware of a computer device) for execution of the wrapped application or wrapper code prior to attempting execution of the application code 122 at the original execution entry point 410.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method of producing a customized installation package, the method comprising:
receiving, by at least one hardware processor, an original installation package, the original installation package configured to install an application in the original installation package onto a computing device;
generating, by the at least one hardware processor and from the original installation package, a customized installation package that includes executable wrapper code for execution upon instantiation of the application;
configuring, by the at least one hardware processor, the executable wrapper code to be executed prior to execution of application code upon execution of the application on the computing device;
identifying, by the at least one hardware processor, an original execution entry point into the application code; and
modifying, by the at least one hardware processor, the executable wrapper code to specify execution of the application code at the original execution entry point upon execution of the modified executable wrapper code included in the customized installation package.

2. The method according to claim 1, further comprising:
utilizing, by the at least one hardware processor, the executable wrapper code to retrieve policy information subsequently used to control an execution of the application code.

3. The method according to claim 1, further comprising:
analyzing, by the at least one hardware processor, a manifest file in the original installation package, the manifest file enumerating digital resources associated with the application, the manifest file indicating the original execution entry point into the application code.

4. The method according to claim 1, wherein modifying the executable wrapper code further comprises:
generating, by the at least one hardware processor, the executable wrapper code to specify a DLL (Dynamic Link Library) file and a corresponding type to be called from the executable wrapper code to start execution of the application.

5. The method according to claim 1, further comprising:
producing, by the at least one hardware processor, a manifest file for inclusion in the customized installation package, the manifest file of the customized installation package derived based at least in part from a manifest file of the original installation package, the manifest file of the customized installation package enumerating digital resources associated with the application and executable wrapper code, the manifest file of the customized installation package indicating an entry point into the executable wrapper code instead of the original execution entry point into the application code as specified by the manifest file of the original installation package.

6. The method according to claim 1, further comprising:
producing, by the at least one hardware processor, the executable wrapper code to create an environment for execution of the application prior to execution of the application at the original execution entry point into the application code as specified by a manifest file of the original installation package, the executable wrapper code included in the customized installation package.

7. The method according to claim 1, further comprising:
accessing, by the at least one hardware processor, a wrapper manifest file and executable wrapper code;
inserting, by the at least one hardware processor, the executable wrapper code into the customized installation package; and
deriving, by the at least one hardware processor, a manifest file for the customized installation package based at least in part on the wrapper manifest file and a manifest file of the original installation package.

8. The method according to claim 1, further comprising:
producing, by the at least one hardware processor, the executable wrapper code; and
including, by the at least one hardware processor, the executable wrapper code in the customized installation package to control an execution of the application.

9. The method according to claim 1, further comprising:
producing, by the at least one hardware processor, the executable wrapper code to control an execution of the application code; and
storing, by the at least one hardware processor, the executable wrapper code in the customized installation package, the executable wrapper code included in the customized installation package for execution upon instantiation of the application, execution of the executable wrapper code modifying original functionality of the application code added to the customized installation package.

10. The method according to claim 1, further comprising:
producing, by the at least one hardware processor, the customized installation package to include the executable wrapper code for execution upon instantiation of the application; and
storing, by the at least one hardware processor, the executable wrapper code in the customized installation package, the executable wrapper code included in the customized installation package to control an execution of the application.

11. The method according to claim 1, further comprising:
providing, by the at least one hardware processor, in the original installation package, a manifest file including instructions to control an execution of the application code upon instantiation of the application.

12. An apparatus comprising:

a customization engine, executed by a computer hardware processor, the customization engine comprising:

storage hardware that stores instructions associated with at least one application executed by the computer processor hardware; and an interconnect coupling the processor and the storage hardware, the interconnect causing execution of the application and performance of operations of:

receiving an original installation package, the original installation package configured to install the application onto a computing device;

generating, from the original installation package, a customized installation package to include executable wrapper code for execution upon instantiation of the application, the execution of the executable wrapper code controlling an execution of the application accessing a wrapper manifest file and the executable wrapper code:

inserting the executable wrapper code into the customized installation package; and deriving a manifest file for the customized installation package based at least in part on the wrapper manifest file and a manifest file of the original installation package, wherein the executable wrapper code is configured to be executed prior to execution of application code upon execution of the application on the computing device.

13. The apparatus according to claim 12, wherein the executable wrapper code facilitates retrieval of policy information subsequently used to manage execution of the application code.

14. The apparatus according to claim 12, wherein the computer processor hardware further supports operations of:

analyzing the original installation package to identify an original execution entry point into the application code; and producing the executable wrapper code to specify execution of the application code at the original execution entry point subsequent to execution of the executable wrapper code.

15. The apparatus according to claim 14, wherein analyzing the original installation package further comprises:

analyzing the manifest file in the original installation package, the manifest file enumerating digital resources associated with the application, the manifest file indicating the original execution entry point into the application code.

16. The apparatus according to claim 14, wherein producing the executable wrapper code further comprises:

generating the executable wrapper code to specify a DLL (Dynamic Link Library) file and a corresponding type to be called from the executable wrapper code to start execution of the application.

17. The apparatus according to claim 12, wherein the computer processor hardware further supports operations of:

producing the manifest file for inclusion in the customized installation package, the manifest file of the customized installation package derived based at least in part from the manifest file of the original installation package, the manifest file of the customized installation package enumerating digital resources associated with the application and the executable wrapper code, the manifest file of the customized installation package indicating an entry point into the executable wrapper code instead of an original execution entry point into the application code as specified by the manifest file of the original installation package.

18. The apparatus according to claim 12, wherein the computer processor hardware further supports operations of:

producing the executable wrapper code to create an environment for execution of the application prior to execution of the application at an original execution entry point into the application code as specified by the manifest file of the original installation package.

19. A non-transitory computer readable medium having stored thereon machine readable instructions, the machine readable instructions, when executed by at least one hardware processor, cause the at least one hardware processor to:

receive an original installation package, the original installation package configured to install an application onto a computing device;

generate, from the original installation package, a customized installation package to include executable wrapper code for execution upon installation of the application, the execution of the executable wrapper code operable to control an execution of the application; and generate, by the at least one hardware processor, the executable wrapper code to specify a DLL (Dynamic Link Library) file and a corresponding type to be called from the executable wrapper code to start execution of the application, wherein the executable wrapper code is configured to be executed prior to execution of application code upon execution of the application on the computing device.

* * * * *